United States Patent
Breau et al.

(10) Patent No.: US 7,873,042 B2
(45) Date of Patent: Jan. 18, 2011

(54) MULTI-LAYERED PACKET SECURITY

(75) Inventors: Jeremy R. Breau, Kansas City, MO (US); John E. Belser, Olathe, KS (US); Tim Swan, Lee's Summit, MO (US); Reza Jafari, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 389 days.

(21) Appl. No.: 11/962,253

(22) Filed: Dec. 21, 2007

(65) Prior Publication Data

US 2009/0161676 A1 Jun. 25, 2009

(51) Int. Cl.
*H04L 12/28* (2006.01)
(52) U.S. Cl. ...................................... 370/389
(58) Field of Classification Search ........................ None
See application file for complete search history.

(56) References Cited

U.S. PATENT DOCUMENTS

| | | | |
|---|---|---|---|
| 6,289,013 B1 * | 9/2001 | Lakshman et al. | 370/389 |
| 6,625,150 B1 * | 9/2003 | Yu | 370/389 |
| 7,002,963 B1 * | 2/2006 | Buyukkoc et al. | 370/395.1 |
| 7,185,365 B2 * | 2/2007 | Tang et al. | 726/13 |
| 7,221,676 B2 * | 5/2007 | Green et al. | 370/401 |
| 7,324,804 B2 * | 1/2008 | Hrastar et al. | 455/410 |
| 2002/0032798 A1 | 3/2002 | Xu | |
| 2006/0007860 A1 | 1/2006 | Komisky | |
| 2007/0147363 A1 | 6/2007 | Oswal et al. | |

OTHER PUBLICATIONS

International Searching Authority, International Search Report with Written Opinion mailed Feb. 5, 2009, pp. 3, 6 and 7,

* cited by examiner

*Primary Examiner*—Robert W Wilson

(57) ABSTRACT

Methods and media for multi-layered packet security control are described. In one embodiment, a header of a packet is modified to include an identifier that identifies a manner in which the packet should be subject to a particular set of a plurality of sets of rules. The particular set of rules dictates how the packet is to be handled. Further, in one embodiment, the packet is communicated to a routing component, and the routing component is configured to reference the identifier to determine which, if any, of the plurality of sets of rules to apply to the packet.

17 Claims, 5 Drawing Sheets

US 7,873,042 B2

MULTI-LAYERED PACKET SECURITY

CROSS-REFERENCE TO RELATED APPLICATIONS

Not applicable.

SUMMARY

The present invention is defined by the claims below. Embodiments of the present invention address at least the issues described herein by providing, among other things, technologies for implementing multi-layered packet security. Embodiments of the present invention have several practical applications in the technical arts, including reducing processing resources expended in network communications, providing for configurability of packets and the rules applied to them as they are routed through a network, and providing for multiplexed security having multiple layers of control.

In a first illustrative aspect, a header of a data packet is modified to include an identifier. The identifier identifies and provides for the determination of a manner in which the packet should be subject to a particular set of a plurality of sets of rules, if at all. The particular set of rules dictates how the packet is to be handled. The packet is communicated to a routing component and the routing component is configured to reference the identifier to determine which, if any, of the plurality of sets of rules to apply to the packet.

In a second illustrative aspect, a packet is received that includes an identifier. The identifier identifies a manner in which the packet should be subject (if at all) to a particular set of rules form a group. The particular set of rules dictates how the packet is to be handled. The identifier is referenced to determine which, if any, of the sets of rules to apply to the packet. If there is a particular set of rules to apply, they are.

In a third illustrative aspect, a packet is received that includes a first identifier that identifies a first manner in which the packet should be subject to a first particular set of rules. The first particular set dictates how the packet is to be handled. The first identifier is referenced to determine which, if any, of the first plurality of sets of rules to apply to the packet. If there is a first particular set of rules to apply, the first particular set of rules is applied to the packet. A header of the packet is modified to include a second identifier that identifies a second manner in which the packet should be subject to a second particular set of a second plurality of sets of rules. The second particular set further dictates how the packet is to be handled. The packet is communicated to a routing component that is configured to reference the second identifier to determine which, if any, of the second plurality of sets of rules to apply to the packet.

It should be noted that this Summary is provided to generally introduce the reader to one or more select concepts described below in the Detailed Description in a simplified form. The Summary is not intended to identify key and/or required features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
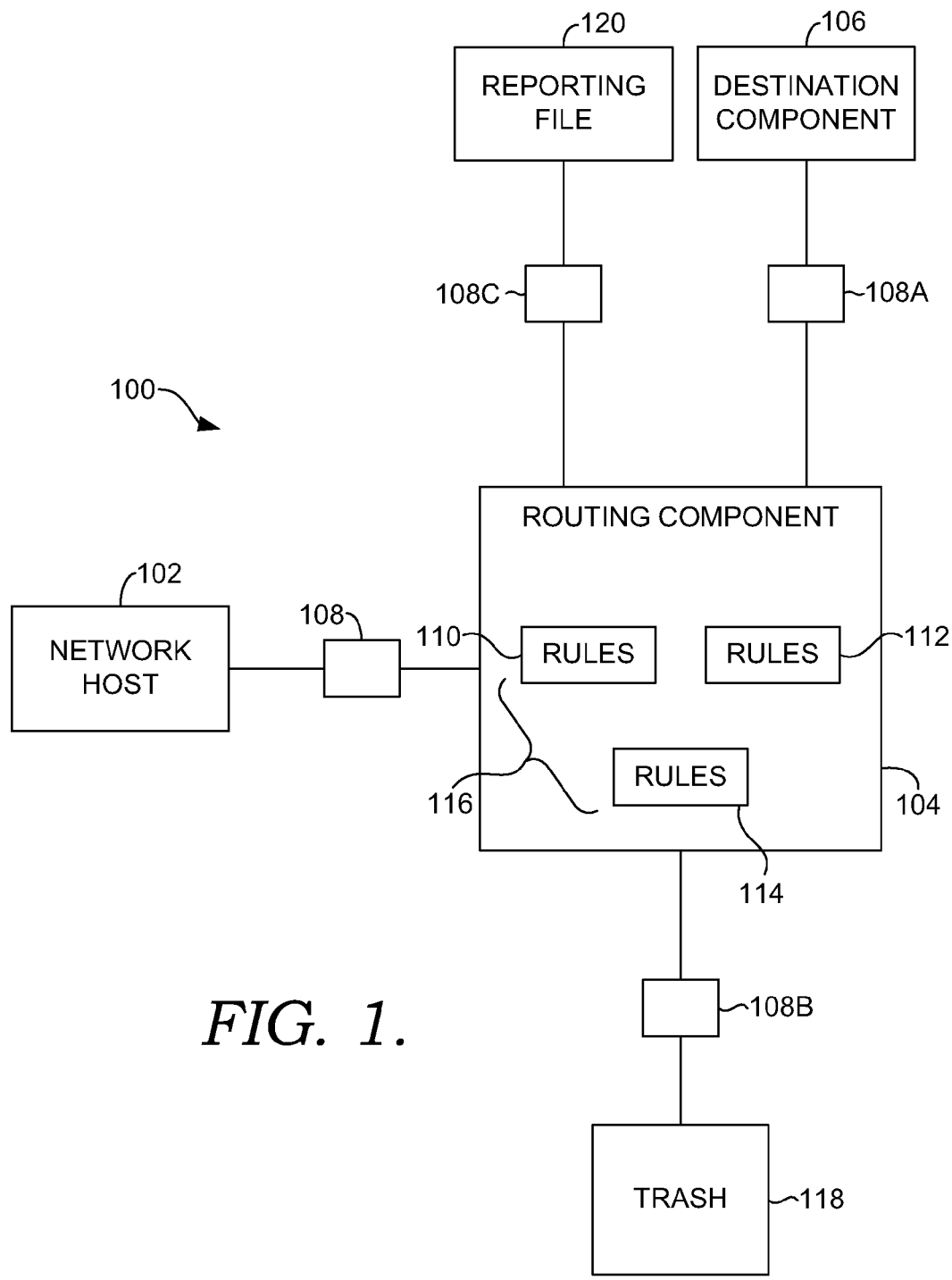
FIG. 1 is a block diagram of an exemplary operating environment illustrating multi-layered packet security, in accordance with an embodiment of the present invention.

The subject matter of the present invention is described with specificity herein to meet statutory requirements. But the description itself is not intended to limit the scope of the patent beyond the claims. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of the individual steps is explicitly described.

Embodiments of the present invention provide multi-layered packet security. The multi-layered packet security allows a network host or a routing component to determine the level of security to be applied to a packet as the packet traverses the network and modify the header of the packet to include an identification of the manner in which the packet should be subject to one of a sets of rules. For instance, assuming a routing component has three available sets of rules that may be applied to a packet, the network host may indicate, by modifying the header of the packet, which of the sets of rules should be applied to the packet when the packet is received by the routing device. By allowing a network host or a routing component to set applicable security, a network can have multi-layered security instead of a single channel of security available only at the routing device using a single set of rules. Stated differently, with a single channel of security, every packet will be subjected to a single set of rules at a routing device. With multi-layered packet security, the routing device may have more than one available sets of rules and, by referencing the identifier in the packet header, the routing device will know which of the more than one available sets of rules to apply. Applying the multi-layered packet security may reduce the processing resources necessary to communicate a packet through a network because once the packet is within an internal security ring, the ingress routing device may modify the packet header to indicate to other routing devices within the security ring that no sets of rules need to be applied to the packet. Additionally, applying the multi-layered packet security provides more comprehensive control of packet communications because one packet from a source going to a destination may be configured to have a first set of rules applied to it at a routing device while another packet from the same source going to the same destination may have a second set of rules applied to it at the same routing device.

Acronyms and Shorthand Notations

Throughout the description of the present invention, several acronyms and shorthand notations are used to aid the understanding of certain concepts pertaining to the associated systems and services. These acronyms and shorthand notations are intended for the purpose of providing an easy methodology of communicating the ideas expressed herein and are in no way meant to limit the scope of the present invention. The following is a list of these acronyms:

ACL Access Control List
CD-ROM Compact Disk Read Only Memory
DVD Digital Versatile Discs
EEPROM Electrically Erasable Programmable Read Only Memory
IP Internet Protocol
IPv6 Internet Protocol Version 6
MTU Maximum Transmission Unit
RAM Random Access Memory
ROM Read Only Memory Further, various technical terms are used throughout this description. An illustrative resource that fleshes out various aspects of these terms can be found in *Newton's Telecom Dictionary* by H. Newton, 22nd Edition (2006).

Embodiments of the present invention may be embodied as, among other things: a method, system, or computer-program product. Accordingly, the embodiments may take the form of a hardware embodiment, a software embodiment, or an embodiment combining software or hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, a routing component, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Multi-layered packet security is used to control how a packet is to be handled as it traverses a network. In one embodiment, a header of a packet is modified to include an identifier that identifies a manner in which the packet should be subject to a particular set of a plurality of sets of rules. In one embodiment, the header of the packet may be modified by a network host, which may take the form of an edge router existing at the outside of an internal network, an internal router within an internal network, or various other routing components involved with handling of the packet. Further, in one embodiment, the plurality of sets of rules may include one or more ACLs. In one embodiment, routing components may apply ACLs to determine how to handle a packet. In one embodiment of the present invention, however, are not limited to ACLs. Instead, it is contemplated and within the scope of the present invention that other sets of rules applied to packets dictating how the packet is to be handled may be used. Still further, in one embodiment, the header of the packet is modified to include an extension header such as the extension headers available with IPv6. In one embodiment of the present invention, however, are not limited to modification of extension headers. Nor are embodiments of the present invention limited to IPv6. Instead, it is contemplated and within the scope of the present invention that other packet header modifications may be used to include the identifier. For instance, in one embodiment, the identifier may be included within an existing field of a packet header that is unused or only partially used.

While various embodiments discussed herein refer to a communications network including various components, embodiments are not limited to any particular network configuration or components discussed herein. Rather, other communication network configurations and other components may be used in conjunction with various embodiments of the present invention. Further, as used herein, the phrase "upstream routing component" is used to reference any routing component that receives the packet before the routing component being discussed. Similarly, as used herein, the phrase "downstream routing component" is used to reference any routing component that receives the packet after the routing component being discussed, either directly or indirectly. For instance, in various packet networks there may be a number of routing components existing at "hops" along the packet path from a network host to a destination. Where the routing component exists at one or more hops on the path before the routing component being discussed, it is referred to herein as an "upstream routing component." Where the routing component exists at one or more hops on the path after the routing component being discussed, it is referred to herein as a "downstream routing component."

Turning now to FIG. 1, a block diagram of an exemplary operating environment illustrating multi-layered packet security in accordance with an embodiment of the present invention is provided and designated generally by reference numeral 100. Exemplary operating environment 100 is shown to illustratively include network host 102, routing component 104, destination component 106, and packet 108. As illustrated here, packet 108 is sublabeled with the reference numerals 108A, 108B, and 108C for discussion of packet 108 as it travels through the network. The sub-labels are intended for clarity purposes while discussing packet 108. Packet 108 may, in one embodiment, be routed differently depending upon how a set of rules applied to the packet dictates how the packet should be handled. As illustrated, exemplary operating environment 100 further includes a packet trash bin 118 and a reporting file 120. As will be discussed in more detail herein, in certain instances, routing component 104 may communicate packet 108 to trash bin 118 and/or reporting file 120.

Before engaging in discussion of the details of the functionality of various components included in FIG. 1, an exemplary overview discussion will be presented to help illustrate the functionality of exemplary operating environment 100. In traditional packet network communications, a network host creates a packet and facilitates communication of the packet to a destination. During transmission between the network host and the destination, there may be various hops at routing components. Typically, each routing component will have a single ACL, the ACL being a set of rules to determine whether the packet should be forwarded to the destination (or downstream routing component), dropped, or reported to the network administrator. The typical ACLs consider each packet based on the source and destination for the packet. From the source and destination information, the ACLs determined whether to allow the packet and forward it, or whether the packet should be dropped or reported to the network administrator. In the typical scheme, each routing device included only one ACL and applied the ACL to all packets, basing the determination of how to handle the packet on the source and destination information.

Embodiments of the present invention provide multi-layer packet security. Using multi-layer packet security a header of a packet may be modified (either by a network host or a routing component) to include an identifier that identifies a manner in which the packet should be subject to a particular set of a plurality of sets of rules, the particular set dictating how the packet is to be handled. Stated differently, with multi-layer packet security, each routing component in a packet network may have a number of sets of rules to apply to determine whether to forward, drop, or report a packet. Because the routing component will not know which set of rules to apply to a given packet, packets will include the identifier instructing the routing component as to which set of rules to apply.

For instance, in one embodiment, a routing component may have three ACLs (e.g., (1) forwarding all packets from one source and dropping all others; (2) dropping all packets with one destination and forwarding all others; and (3) reporting all packets from one source and forwarding all others). In these embodiments, a network host may modify the header of the packet to include an indication of which ACL to apply to a packet. Or, in these embodiments, an upstream routing component may perform the header modification, including the indication of which ACL to apply. In fact, the network host or upstream routing component may instruct the routing component not to apply any of the three ACLs at all. Thus, instead of limiting packet networks to a single level of security at each individual routing component, embodiments of the present invention provide multi-layered packet security allowing for serial or overlapping security rings, as will be discussed in more detail herein.

Having provided an exemplary overview discussion of multi-layer packet security, the various components of exemplary operating environment 100 will now be discussed. Network host 102 facilitates communication of packet 108. In one embodiment, network host 102 modifies a header of packet 108 to include an identifier that identifies the manner in which the packet should be subject to a particular set of rules, by routing component 104 for example. In one embodiment of the present invention, the header is modified using an extension header, such as the extension headers available in IPv6. Embodiments are not limited to extension headers, nor to IPv6 implementations. The discussion herein is illustrates various embodiments in which a header may be modified to include an identifier.

As discussed above, in one embodiment, the indicator may indicate to routing component 104 that a particular set of rules should be applied to packet 108. In various other embodiments, the indicator may indicate to routing component 104 that no sets of rules should be applied to packet 108. Still further, in one embodiment, the particular set of rules indicated by the indicator in the header of packet 108 may not be available to routing component 104. For instance, where the set of rules is a particular ACL, routing component 104 may not have the particular ACL loaded or otherwise available. In one embodiment, where the set of rules indicated by the indicator in the header of packet 108 is unavailable to routing component 104, routing component 104 may apply a default set of rules to the packet. Thus, network host 102 (or other upstream routing components) can control security for packets, or ensure that packets are subject to the proper security scheme. For instance, a network host 102 may classify packets either as part of an "executive" communication or part of a "standard user" communication. Where network host 102 classifies a packet as "executive," network host 102 may modify the header of the packet to include an identifier that identifies a manner of subjecting the packet to a set of rules. In this example, the manner may be subjecting the packet to no rules at all. Thus, upon recognizing the identifier, routing component 104 would forward the packet without applying any sets of rules. Where network host 102 classifies a packet as "standard user," network host 102 may modify the header of the packet to include an identifier that identifies a set of rules that forwards all packets except those packets with a source of a set of known malicious sites.

Once network host 102 has modified the header of packet 108 to include the identifier, network host 102 will communicate packet 108 to routing component 104. As illustrated here there is only one routing component 104 between network host 102 and destination component 106. As will be understood and appreciated by those having skill in the art, however, various embodiments of the present invention contemplate a plurality of routing components between network host 102 and destination component 106. For instance, a particular packet, such as packet 108, may be transmitted to a number of routing components (i.e., a number of hops) as it traverses a packet network. The illustration of exemplary operating environment 100 is intended for discussion and is a simplified version of many packet networks that may implement multi-layered packet security.

As previously discussed, in one embodiment, routing components, in addition to network host 102, may be configured to modify a header of a packet to include an identifier. For instance, a routing component may be an ingress router for an internal network that is part of the entire packet network. The internal network may include a number of hops before the egress router that communicates packets out to the remainder of the entire packets network. In these embodiments, the ingress router may apply a set of rules on a packet, such as packet 108, and may determine that the packet should be forwarded. Instead of applying the same set of rules at every hop within the internal network, the ingress router may modify the header of a packet, such as packet 108, to include an identifier that instructs the other routing components within the internal network to avoid the application of any rules to the packet. In this way, the processing power expended to communicate the packet across the internal network would be minimized. Then, in these embodiments, the egress router may remove the identifier from the packet. This functionality will be discussed in more detail herein, but is presented to provide an exemplary instance in which a downstream routing component may modify the header.

In one embodiment, network host 102 is responsible for ensuring packet 108 is at or below the MTU for the packet network. As will be understood and appreciated by those having ordinary skill in the art, the MTU is the maximum packet size for transmission in the packet network. Thus, in one embodiment, network host 102 will construct packets and include a payload appropriately sized so that the bytes of the payload and the packet header do not exceed the MTU. A problem may arise where network host 102 creates a packet, such as packet 108, at the MTU where a downstream router adds additional information, such as an identifier that identifies a manner in which the packet should be subject to a set of rules, to the packet. For instance, if the MTU is 1500 bytes and network host 102 creates a packet with a 1450-byte payload and a 50-byte header, the packet will exceed the MTU if a downstream router adds an additional 20 bytes to the header to include an identifier. In one embodiment of the present invention contemplate various solutions to ensure the downstream router security functionality of multi-layer packet security does not compromise the viability of a packet as it traverses the packet network. For instance, in one embodiment, the downstream router having multi-layer packet security functionality may advertise an MTU to the network host lower than the actual MTU. For instance, if a downstream router is configured to add an identifier requiring an additional 50 bytes of header space, the downstream router may advertise an MTU to network host 102 that is 50 bytes less than the actual MTU. In the 1500-byte MTU example, the downstream router may advertise an MTU of 1450. Thus, network host 102 will create packets (payload+header) having no greater length than 1450 bytes. When downstream router adds an identifier, the total packet length will remain at or below the MTU of 1500 bytes. This exemplary discussion of MTU advertising by routing components is intended for illustrative purposes and is not intended to limit the scope of the present invention to the exemplary embodiments discussed. Instead, it is contemplated and within the scope of the present invention that various MTU advertising techniques may be used by routing components to ensure an appropriate packet size while using multi-layered packet security.

In another embodiment, the downstream router may be configured to split a packet if a packet exceeds an MTU. For instance, where network host 102 creates a packet at the MTU of 1500 bytes, and where a downstream router adds an identifier that requires an additional 50 bytes of header space, the packet will be above the MTU at 1550 bytes. Here, the downstream router may be configured to recognize that the 1550-byte packet is above the MTU and may further be configured to divide the payload into two smaller payloads and append the header to each. The divided payloads would result in two packets that are below the MTU, allowing for communication across the packet network that is within the bounds of the network's protocols. Again, this discussion is merely exemplary and is not intended to limit the scope of the present invention to the exemplary embodiments discussed because it is contemplated and within the scope of the present invention that other packet-dividing techniques may be used.

Turning now to other components in exemplary operating environment 100, routing component 104 includes a particular set of rules 110, a particular set of rules 112, and a particular set of rules 114, the plurality of sets of rules identified by reference numeral 116. As illustrated here, the plurality of sets of rules 116 are included within routing component 104. Embodiments of the present invention, however, are not limited to routing components having local sets of rules, such as the plurality of sets of rules 116. Instead, it is contemplated and within the scope of the present invention that the plurality of sets of rules 116 may be remote from, and accessed by, routing components such as routing component 104. As previously discussed, network host 102 (or another upstream routing component) may modify a header of a packet to include an identifier that identifies a manner in which routing component 104 should subject the packet to a particular set of rules. For instance, the identifier may indicate to routing component 104 that particular set of rules 112 should be applied to a packet. In that instance, routing component 104 will apply particular set of rules 112 which will dictate how the packet is to be handled (e.g., whether routing component 104 will forward the packet, drop the packet, or report the packet). As previously discussed, the plurality of sets of rules 116 may be ACLs that routing component 104 may be configured to apply to packets. Because the plurality of sets of rules 116 will dictate handling of the packet by routing component 104, routing component 104 may forward the packet differently based upon the particular set of rules 110, 112, and 114 applied.

By way of example, assuming the identifier in the header of packet 108 indicates to routing component 104 to apply the particular set of rules 110 and the particular set of rules 110 instructs routing component 104 to forward the packet (e.g., the particular set of rules 110 may be an ACL allowing all packets except those from one malicious source and packet 108 is from a source other than the malicious source). As illustrated, routing component 104 will forward packet 108A to destination component 106. As illustrated here, there are no intermediate routing components between routing component 104 and destination component 106, but those having skill in the art will understand and appreciate that in one embodiment of the present invention intermediate routing components may exist. By way of another example, assuming the identifier in the header of packet 108 indicates to routing component 104 to apply the particular set of rules 112 and the particular set of rules 112 instructs routing component 104 to drop the packet (e.g., the particular set of rules 112 may be an ACL dropping all packets except those from one known source and packet 108 is from a source other than the known source). As illustrated, routing component 104 will drop packet 108B to packet trash bin 118. As illustrated the packet is forwarded to packet trash bin 118, but in one embodiment, routing component 104 may not forward the packet at all. By way of yet another example, assuming the identifier in the header of packet 108 indicates to routing component 104 to apply the particular set of rules 114 and the particular set of rules 114 instructs routing component 104 to report the packet (e.g., the particular set of rules 114 may be an ACL reporting all packets except those from one known source and packet 108 is from a source other than the known source). As illustrated, routing component 104 will report packet 108C to reporting file 120. As will be understood and appreciated by those having ordinary skill in the art, reporting file 120 may be a file, a database, or various types of computer storage media that is configured to collect reported packets for review by a network administrator.

Figure 2:
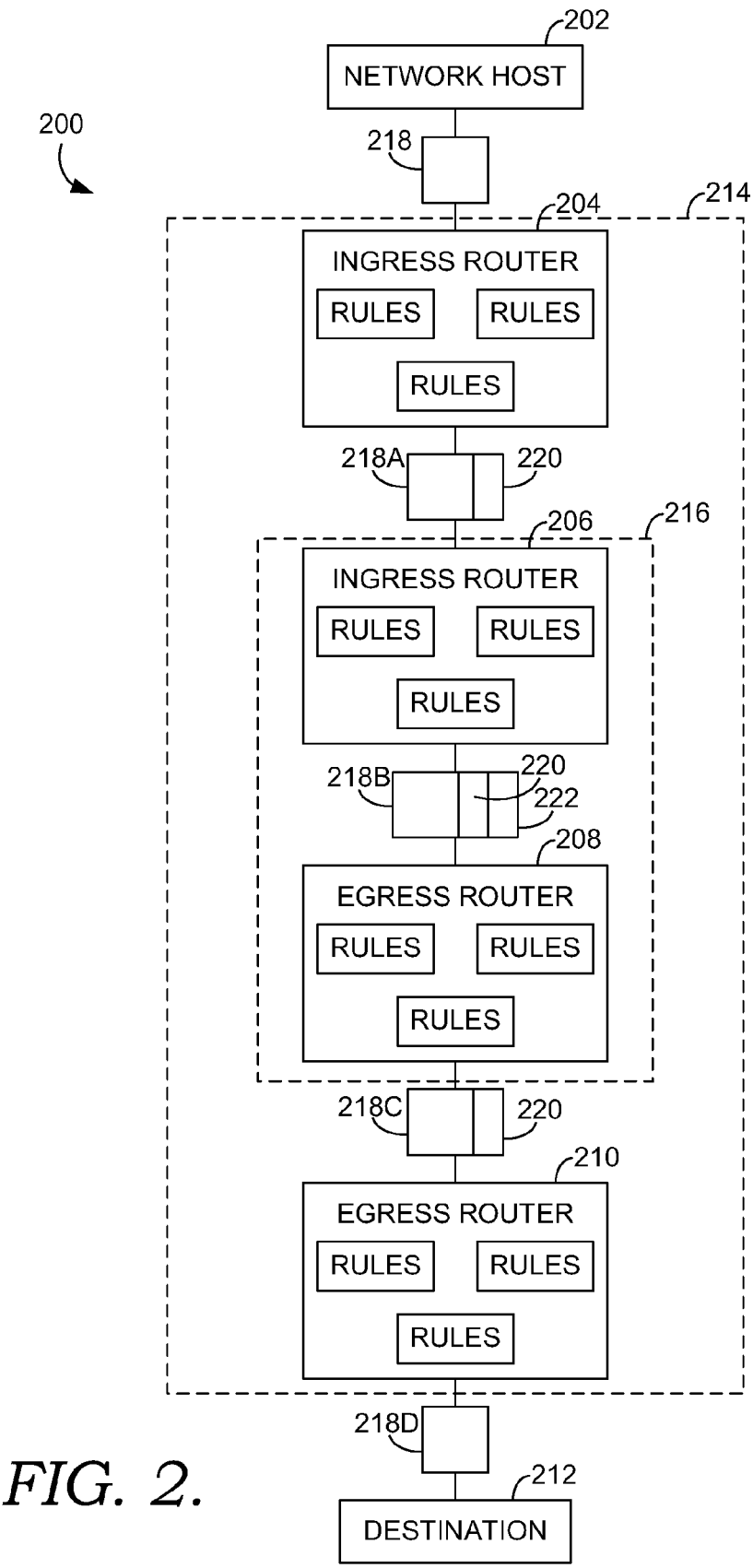
FIG. 2 is a block diagram of an exemplary operating environment illustrating multi-layered packet security having overlapping security rings, in accordance with an embodiment of the present invention.

Turning now to FIG. 2, a block diagram of an exemplary operating environment showing multi-layered packet security having overlapping security rings, in accordance with an embodiment of the present invention is illustrated and designated generally by reference numeral 200. As illustrated here, exemplary operating environment 200 includes network host 202, ingress routing component 204, ingress routing component 206, egress routing component 208, egress routing component 210, and a destination component 212. The components illustrated here may be similar to the components of FIG. 1, but are illustrated and numbered separately for clarity purposes during discussion of the security rings. As illustrated here, an outer security ring 214 overlaps an inner security ring 216. As used herein, the phrase "edge routing component" may be used to refer to both ingress and egress routing components. A packet 218 is illustrated as it traverses the packet network. As before, sub-headings 218A, B, C, and D are used to denote the packet as it progresses through the network so packet 218 may be more precisely described in some situations.

Exemplary operating environment 200 illustrates how overlapping security rings may be used with multi-layer packet security. Here, network host 202 creates packet 218 and communicates packet 218 to ingress routing component 204 without any identifier as to a particular set of rules to be applied by ingress routing component 204. Thus, ingress router applies a default set of rules to packet 218. Ingress routing component 204, however, is not yet ready to communicate packet 218 to the next hop because ingress routing component 204 is within outer security ring 214. In this exemplary discussion, assume outer security ring 214 is moderately secure and that a network administrator seeks to apply moderate security (e.g., an ACL dropping packets from known malicious sources and forwarding all others) to packet 218. Ingress routing component 204 may modify packet 218 with an identifier of the desired set of rules, as indicated at 218A having identifier 220.

Ingress routing component 206 receives packet 218A and, because it recognizes identifier 220, applies the set of rules identified (here, the set of rules for moderate security). Ingress routing component 206 is not yet ready to communicate packet 218A to the next hop because ingress routing component 206 is within inner security ring 216 and, in this example, inner security ring 216 may be very secure.

Thus, in this exemplary discussion, assume a network administrator seeks to apply no sets of rules to packet 218A while the packet is in inner security ring 216. Ingress routing component 206 may modify packet 218A with an identifier of the manner in which rules are to be applied, indicating to downstream hops that no sets of rules need be applied to packet 218A. This is illustrated at packet 218B which has identifier 220 (from the outer security ring 214) and identifier 222 (from inner security ring 216).

Egress routing component 208 then receives packet 218B and, because it first recognizes identifier 222, applies the particular set of rules identified (here, the manner in which the rules are applied indicate that no sets of rules are to be applied). Egress routing component 208 is not yet ready to communicate packet 218B to the next hop because, as an egress router, egress routing component 208 will remove the top layer of security from packet 218B. Thus, as illustrated here, egress routing component 208 will remove identifier 222 from packet 218B.

Egress routing component 208 removes this identifier because, once egress routing component 208 has communicated the packet, the packet will be outside of inner security ring 216, although still within outer security ring 214. This is illustrated at packet 218C, which has only identifier 220 (from the outer security ring 214). Similarly, egress routing component 210, which exists at the downstream edge of outer security ring 214, receives packet 218C and, recognizing identifier 220, applies the particular set of rules identified (here, the set of rules for moderate security).

Egress routing component 210 then removes identifier 220 from packet 218C and communicates the packet outside outer security ring 214 to destination component 212, as illustrated with packet 218D. The exemplary discussion provided with reference to FIG. 2 is intended to be illustrative only as a way of demonstrating overlapping security rings. But this exemplary discussion is not intended to limit embodiments of the present invention to the particular examples discussed.

Figure 3:
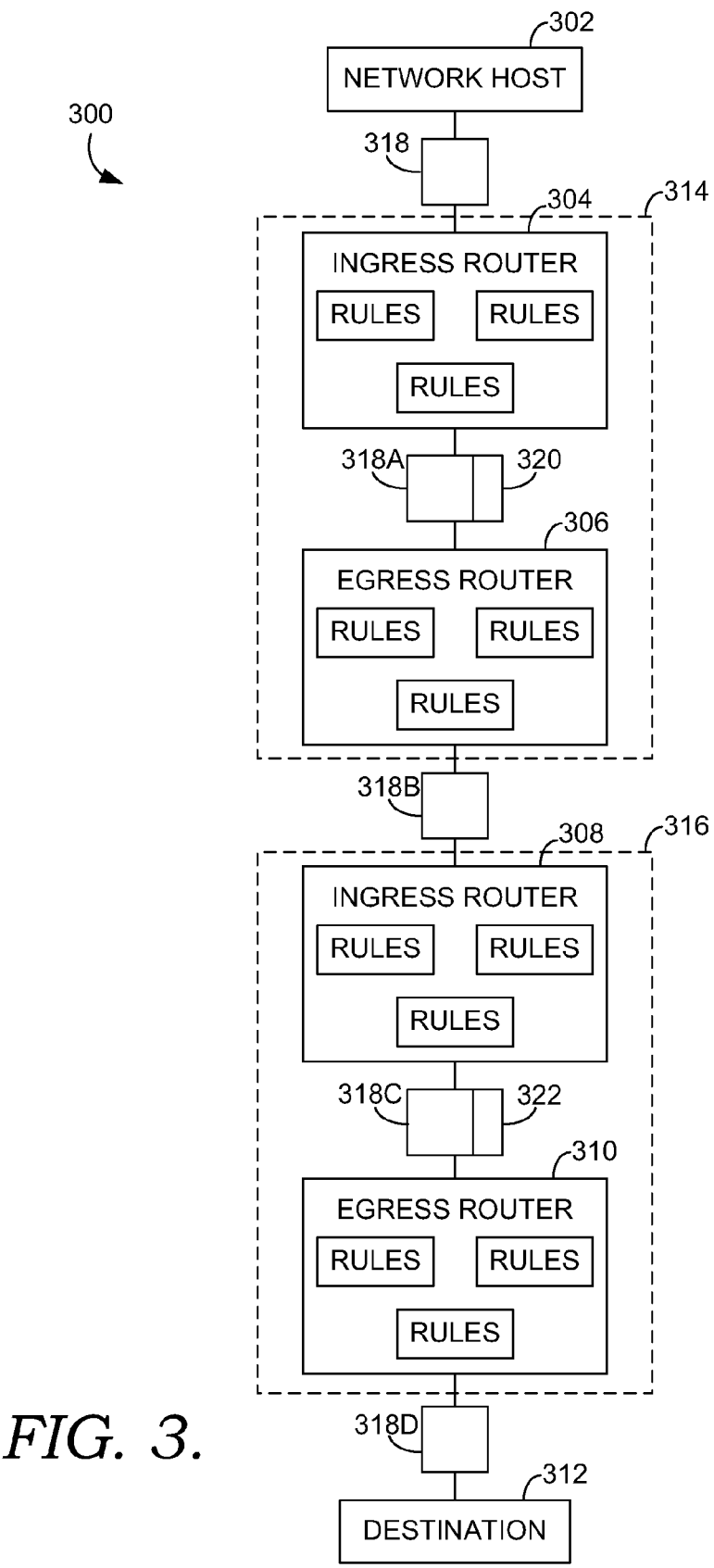
FIG. 3 is a block diagram of an exemplary operating environment illustrating multi-layered packet security having serial security rings, in accordance with an embodiment of the present invention.

Turning now to FIG. 3, a block diagram of an exemplary operating environment showing multi-layered packet security having serial security rings, in accordance with an embodiment of the present invention is illustrated and designated generally by reference numeral 300. As illustrated here, exemplary operating environment 300 includes a network host 302, an ingress routing component 304, an egress routing component 306, an ingress routing component 308, an egress routing component 310, and a destination component 312. The components illustrated here may be similar to the components of FIGS. 1-2, but are illustrated and numbered separately for clarity purposes during discussion of the security rings.

As illustrated here, a first security ring 314 resides adjacent to, or in series with, a second security ring 316. A packet 318 is illustrated as it traverses the packet network. As before, sub-headings 318A, B, C, and D are used to denote the packet as it progresses through the network so packet 319 may be accurately described at various positions. Exemplary operating environment 300 illustrates how serial security rings may be used with multi-layer packet security. Here, network host 302 creates packet 318 and communicates packet 318 to ingress routing component 304 without any identifier as to a particular set of rules to be applied by ingress routing component 304. Thus, ingress routing component 304 applies a default set of rules to packet 318.

Ingress routing component 304, however, is not yet ready to communicate packet 318 to the next hop because ingress routing component 304 is within first security ring 314. In this exemplary discussion, assuming first security ring 314 is moderately secure and that a network administrator seeks to apply moderate security (e.g., an ACL dropping packets from known malicious sources and forwarding all others) to packet 318. Ingress routing component 304 may modify packet 318 with an identifier of the desired set of rules, as illustrated with packet 318A, which includes identifier 320. Egress routing component 306 then receives packet 318A and, because it recognizes identifier 320, applies the set of rules identified (here, the set of rules for moderate security). Egress routing component 306, however, will strip packet 318A of identifier 320 before communicating the packet to the next hop because egress routing component 306 exists at the downstream edge of first security ring 314.

Ingress routing component 308 then receives packet 318B and, because there is no identifier attached, applies a default set of rules to packet 318B. Ingress routing component 308, because it exists at the front edge of second security ring 316, is not yet ready to communicate packet 318B to the next hop. Instead, assuming for this example that second security ring 316 is very secure and a network administrator does not want any sets of rules applied to packets while within second security ring 316, ingress routing component 308 may modify packet 318B with an identifier of the manner in which rules are to be applied, indicating to downstream hops that no sets of rules need be applied to packet 318B.

This is illustrated at packet 318C which includes identifier 322 (from second security ring 316). Packet 318C is then received by egress routing component 310, which exists at the downstream edge of second security ring 316. Egress routing component 310 recognizes identifier 322 and applies the particular set of rules identified (here, the manner in which the rules are applied indicate that no sets of rules are to be applied). Egress routing component 310 then removes identifier 322 from packet 318C and communicates the packet outside second security ring 316 to destination component 312, as illustrated with packet 318D. The exemplary discussion provided with reference to FIG. 3 is intended to be illustrative only as a way of demonstrating overlapping security rings. But this exemplary discussion is not intended to limit embodiments of the present invention to the particular examples discussed.

Figure 4:
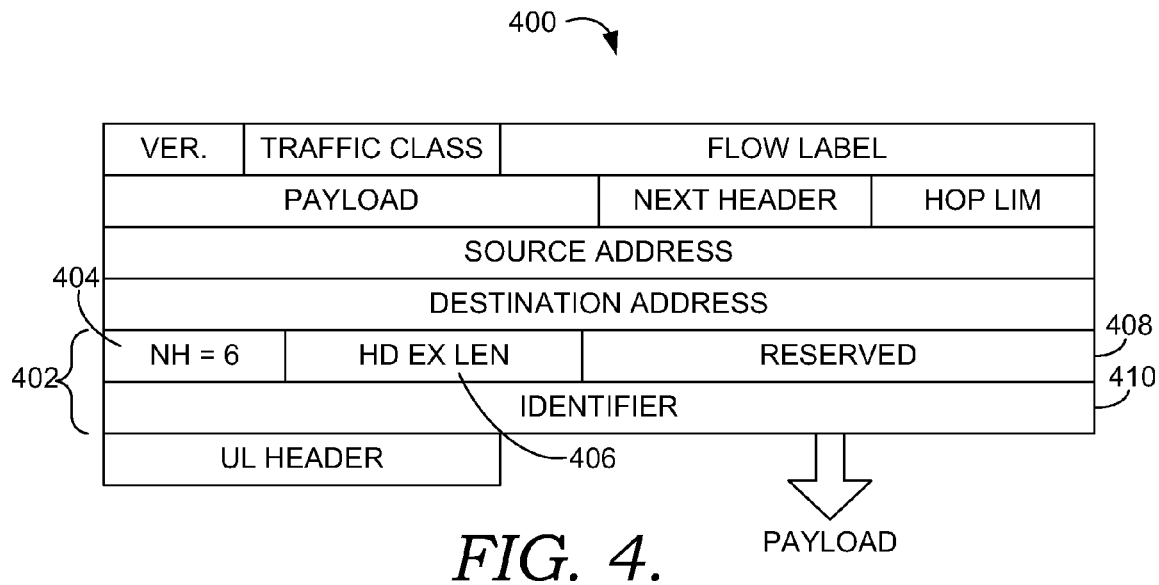
FIG. 4 is a block diagram illustrating an exemplary packet header, in accordance with an embodiment of the present invention.

Turning now to FIG. 4, a block diagram illustrating an exemplary packet header, in accordance with an embodiment of the present invention, is illustrated and designated generally by reference numeral 400. Although exemplary packet header 400 is provided for illustrative purposes, embodiments of the present invention are not limited to the particular header configuration shown in FIG. 4. Instead, it is contemplated that various types of packets, including various header configurations, may be utilized. In the exemplary packet header 400, an identifier 410 may be included within an extension header 402. As illustrated, extension header 402 also includes a next header field 404, an extension header length field 406, and a reserved field 408.

The illustrated header is similar to headers and header extensions used with IPv6. Embodiments of the present invention, however, are not limited to IPv6 implementations. Instead, it is contemplated and within the scope of the present invention that multi-layered packet security may be used with various packet types having various header structure. Further, although the discussion herein focuses on modifying a header of a packet to include an identifier, such as identifier 410 into an extension header, embodiments of the present invention contemplate that a header of a packet may be modified in other ways to include an identifier.

Figure 5:
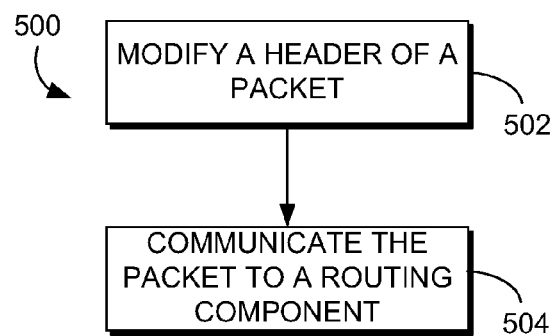
FIG. 5 is a flow diagram illustrating an exemplary method for multi-layered packet security, in accordance with an embodiment of the present invention.

Turning now to FIG. 5, a flow diagram illustrating an exemplary method for multi-layered packet security, in accordance with an embodiment of the present invention, is illustrated and designated generally by reference numeral 500. Initially, as indicated at a step 502, a header of a packet, e.g., packet 108 of FIG. 1, is modified to include an identifier that identifies a manner in which the packet should be subject to a particular set of a plurality of sets of rules. In one embodiment, the particular set of rules dictates how the packet is to be handled. As previously stated, the packet may be modified by a network host, an edge router existing on the edge of a security ring, or any other routing component existing on a packet network.

At a step 504, the packet is communicated to a routing component, e.g., routing component 104 of FIG. 1. In one embodiment, the routing component is configured to reference the identifier to determine which, if any, of the plurality of sets of rules to apply to the packet. For instance, as previously stated, the routing component may have three available ACLs to apply to packets and the indicator may instruct the routing component to apply a particular ACL or no ACL at all. Depending upon the result of applying a particular ACL or no ACL to the packet, the routing component may be configured to forward, drop, or report the packet.

Figure 6:
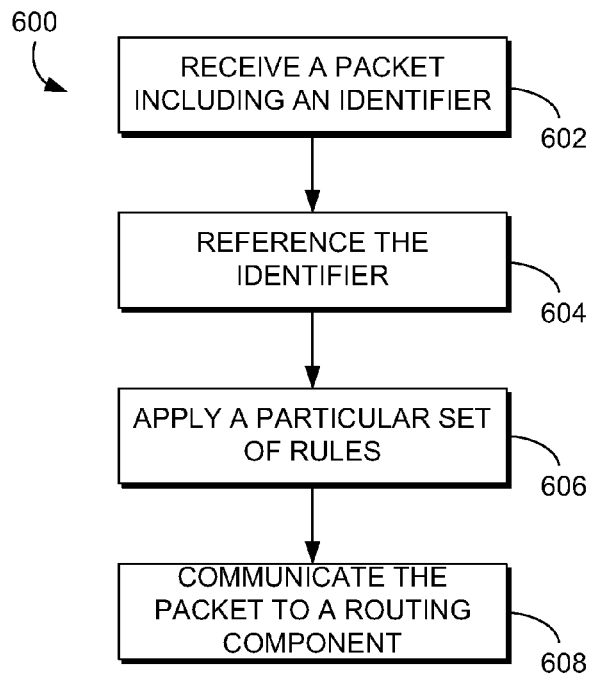
FIG. 6 is a flow diagram illustrating an exemplary method for multi-layered packet security, the method having a different point of view than the method of FIG. 5, in accordance with an embodiment of the present invention.

Turning now to FIG. 6, a flow diagram of an exemplary method for multi-layered packet security, the method having a different point of view than the method of FIG. 5, in accordance with an embodiment of the present invention, is illustrated and designated generally by reference numeral 600. Initially, as indicated at a step 602, a packet is received, e.g., by routing component 104 of FIG. 1. As previously discussed, in one embodiment the packet includes an identifier that identifies a manner in which the packet should be subject to a particular set of a plurality of sets of rules and the particular set dictates how the packet is to be handled. For instance, where a network host or an upstream router is within a security ring, the network host or upstream router may provide instructions regarding the type of security, or sets of rules, to apply.

As indicated at a step 604, the identifier is referenced to determine which, if any, of the plurality of sets of rules to apply to the packet. As previously discussed, a routing component may have available a number of sets of rules and the identifier may indicate which of the sets of rules to apply. Also, in one embodiment the identifier indicates that none of the sets of rules is to be applied. Still further the identifier may indicate a set of rules that is unavailable to the routing component. In those embodiments, the routing component may be configured to apply a default set of rules to the packet.

At a step 606, a particular set of the plurality of sets of rules, if any, is applied to the packet. For instance, as previously discussed, where the sets of rules are ACLs, the routing component may apply a particular ACL to determine whether to forward the packet to the next hop. If the routing component determines, by applying the particular ACL that the packet is not to be forwarded, the routing component will further determine whether to drop the packet or to report the packet to a network administrator. At a step 608, the packet is communicated to a routing component, e.g., routing component 104 of FIG. 1, as discussed with reference to FIG. 5.

Figure 7:
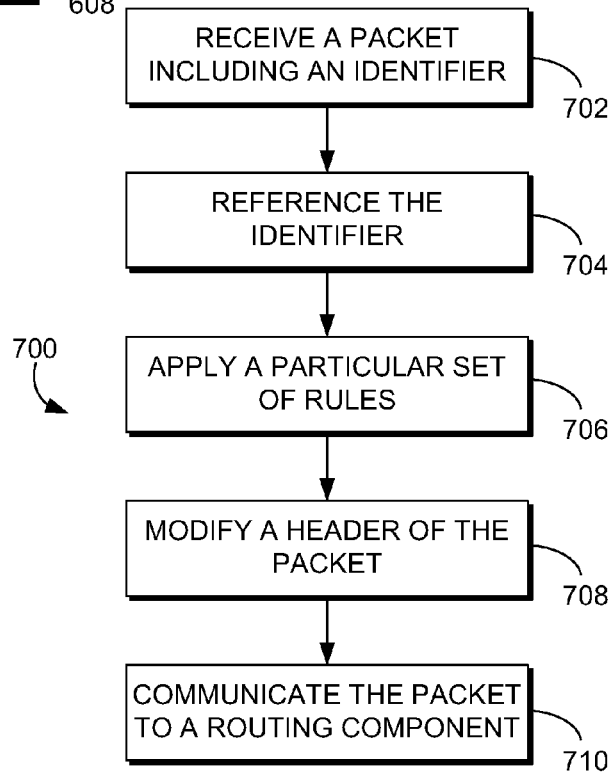
FIG. 7 is a flow diagram illustrating an exemplary method for multi-layered packet security, the method having more detail than the methods of FIGS. 5 and 6, in accordance with an embodiment of the present invention.

Turning now to FIG. 7, a flow diagram of an exemplary method for multi-layered packet security, the method having more detail than the method of FIGS. 5 and 6, in accordance with an embodiment of the present invention is illustrated and designated generally by reference numeral 700. Initially, as indicated at step 702, a packet is received, e.g., by routing component 104 of FIG. 1. At steps 704 and 706, the identifier is referenced and a particular set of rules, if any, is applied to the packet as previously discussed with reference to FIG. 6. Further, at a step 708, the packet is modified to include another identifier and then the packet is communicated as illustrated at a step 710 and as previously discussed with reference to FIG. 5. Thus, the flow shown in FIG. 7 may include embodiments in which a routing component receives a packet with multi-layered packet security and applies yet another layer of security to the packet. For instance, in one embodiment, the routing component may be in an overlapping security ring scheme such as that discussed with reference to FIG. 2.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media ("media") having computer-useable instructions embodied thereon that, when executed by a processor, cause the processor to perform steps for enabling multi-layered packet security, the steps comprising:

modifying, using a first routing component, a header of a packet to include an identifier that identifies a manner in which a second routing component should subject the packet to a particular set of a plurality of sets of rules, wherein the particular set dictates whether the packet is to be forwarded; and communicating the packet to the second routing component, which is configured to reference the identifier to determine which, if any, of the plurality of sets of rules to apply to the packet, wherein the second routing component also is configured to modify the header of the packet to include an additional identifier that identifies a manner in which the packet should be subject to an additional particular set of an additional plurality of sets of rules, wherein the additional particular set further dictates how the packet is to be handled, and wherein the modified header includes the identifier and the additional identifier.

2. The media of claim 1, wherein the manner in which the packet should be subject to the particular set of the plurality of sets of rules includes not subjecting the packet to any of the plurality of sets of rules.

3. The media of claim 1, wherein the particular set of the plurality of sets of rules is unavailable to the second routing component and wherein the second routing component is configured to apply a default set of rules to the packet.

4. The media of claim 1, wherein a network host modifies the header of the packet and communicates the packet to the first routing component.

5. The media of claim 1, wherein an edge routing component modifies the header of the packet and communicates the packet to the first routing component.

6. The media of claim 1, wherein the second routing component advertises a maximum transmission unit less than a maximum packet size allowed by a network on which the second routing component operates, ensuring the header of the packet can be modified to include the additional identifier without exceeding the maximum packet size.

7. A method of enabling multi-layered packet security, the method comprising:
   receiving, at a routing component having a plurality of available sets of rules, a packet including an identifier that identifies a manner in which the routing component should subject the packet to a particular set of a plurality of sets of rules, wherein the particular set dictates whether the packet is to be forwarded;
   referencing, using the routing component, the identifier to determine which, if any, of the plurality of sets of rules to apply to the packet;
   applying, using the routing component, the particular set, if any, of the plurality of sets of rules to the packet, wherein the routing component is configured to modify a header of the packet to include an additional identifier that identifies a manner in which the packet should be subject to an additional particular set of an additional plurality of sets of rules, wherein the additional particular set further dictates how the packet is to be handled, and further wherein the modified header includes the identifier and the additional identifier; and
   communicating the packet to a routing component.

8. The method of claim 7, wherein applying the particular set of the plurality of sets of rules, if any, to the packet includes not subjecting the packet to any of the plurality of sets of rules.

9. The method of claim 7, wherein applying the particular set of the plurality of sets of rules, if any, to the packet includes:
   determining that the particular set of the plurality of sets of rules is unavailable; and
   applying a default set of rules to the packet.

10. The method of claim 7, wherein the packet is received from a network host.

11. The method of claim 7, wherein the packet is received from a routing component.

12. The method of claim 7, wherein the routing component advertises a maximum transmission unit less than a maximum packet size allowed by a network on which the routing component operates, ensuring the header of the packet can be modified to include the additional identifier without exceeding the maximum packet size.

13. One or more non-transitory computer-readable media ("media") having computer-usable instructions embodied thereon that, when executed by a processor, cause the processor to perform steps for enabling multi-layered packet security, the method comprising:
   receiving, at a first routing component, a packet including a first identifier that identifies a first manner in which the first routing component should subject the packet to a first particular set of a first plurality of sets of rules, wherein the first particular set dictates how the packet is to be handled;
   referencing, using the first routing component, the first identifier to determine which, if any, of the first plurality of sets of rules to apply to the packet;
   applying, using the first routing component, the first particular set of the first plurality of sets of rules, if any, to the packet;
   modifying, using the first routing component, a header of the packet to include, in addition to the first identifier, a second identifier that identifies a second manner in which a second routing component should subject the packet to a second particular set of a second plurality of sets of rules, wherein the second particular set further dictates how the packet is to be handled; and
   communicating, using the first routing component, the packet to the second routing component, wherein the second routing component is configured to reference the second identifier to determine which, if any, of the second plurality of sets of rules to apply to the packet.

14. The media of claim 13, wherein applying the first particular set of the first plurality of sets of rules, if any, to the packet includes not subjecting the packet to any of the first plurality of sets of rules.

15. The media of claim 13, wherein applying the first particular set of the first plurality of sets of rules, if any, to the packet includes:
   determining that the first particular set of the first plurality of sets of rules is unavailable; and
   applying a default set of rules to the packet.

16. The media of claim 13, wherein the second routing component is configured to modify the header of the packet to include a third identifier that identifies a third manner in which the packet should be subject to a third particular set of a third plurality of sets of rules, wherein the third particular set further dictates how the packet is to be handled.

17. The media of claim 16, wherein the second routing component advertises a maximum transmission unit less than a maximum packet size allowed by a network on which the second routing component operates, ensuring the header of the packet can be modified to include the third identifier without exceeding the maximum packet size.

* * * * *